Sept. 1, 1925.  1,551,694
J. REECE ET AL
MECHANICAL POWER TRANSMISSION
Filed Feb. 21, 1923   4 Sheets-Sheet 2

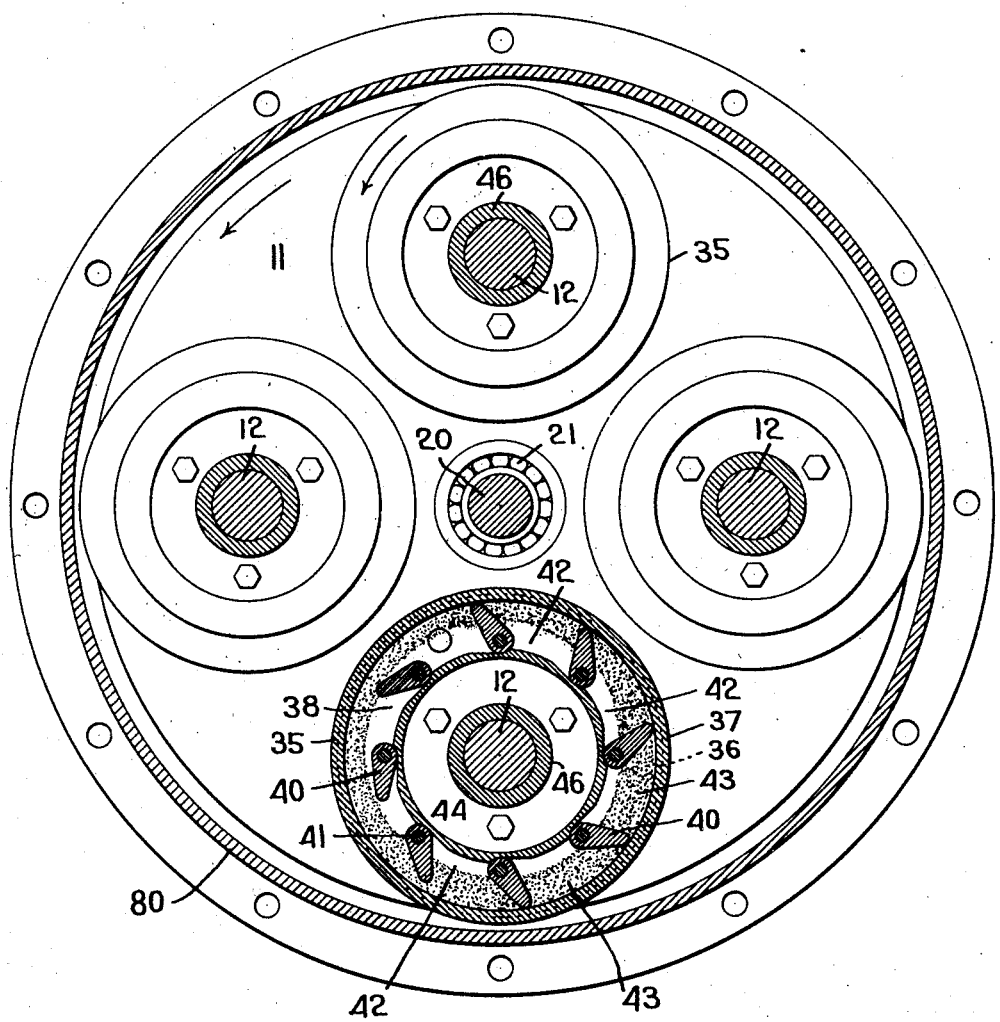

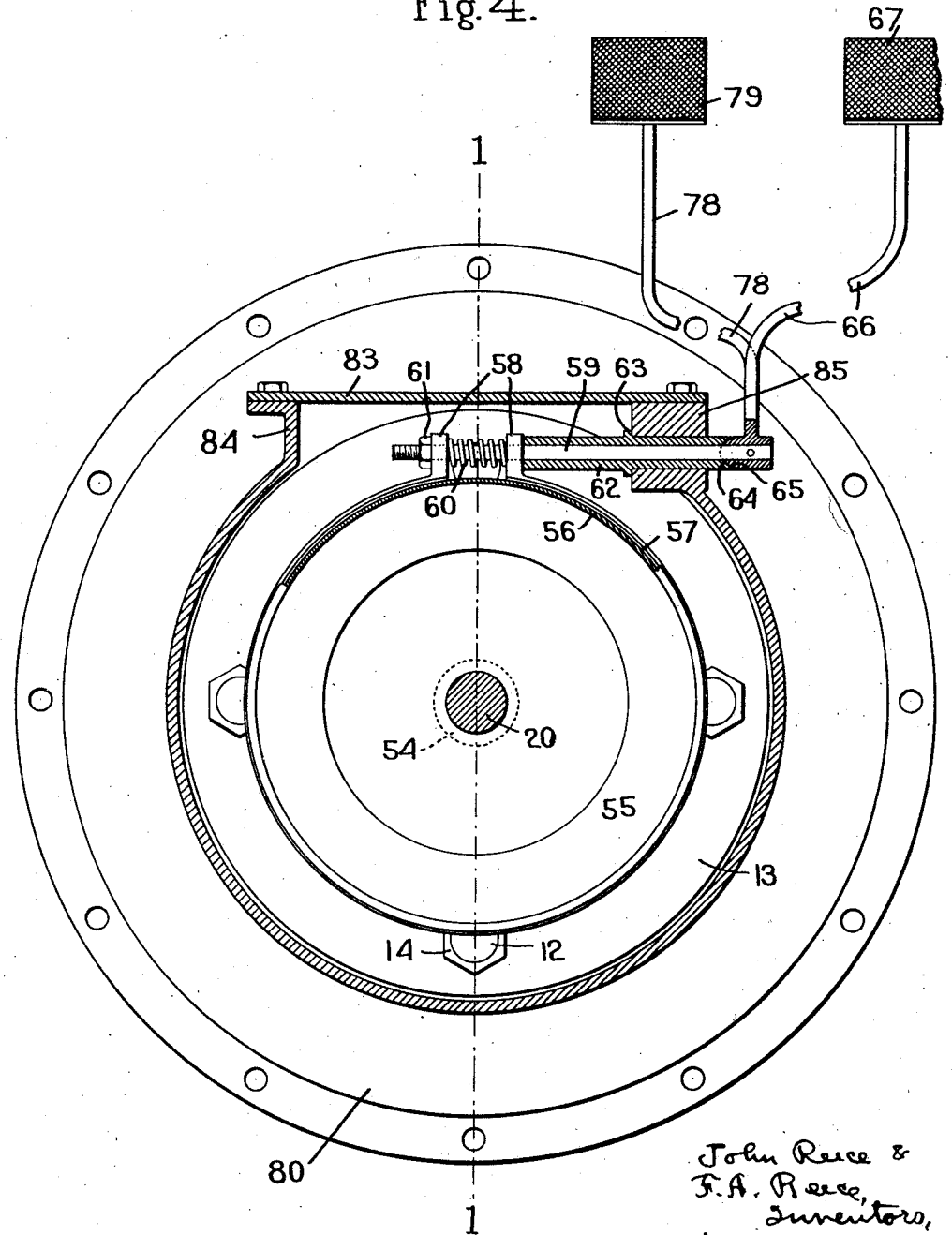

Patented Sept. 1, 1925.

1,551,694

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

MECHANICAL-POWER TRANSMISSION.

Application filed February 21, 1923. Serial No. 620,467.

*To all whom it may concern:*

Be it known that we, JOHN REECE and FRANKLIN A. REECE, citizens of the United States, residing at Boston and Brookline, respectively, in the counties of Suffolk and Norfolk and State of Massachusetts, have invented certain new and useful Improvements in Mechanical-Power Transmission, of which the following is a specification, reference being had therein to the accompanying drawing.

This invention relates to mechanical power transmission and involves a novel method and apparatus for transmission of mechanical power, adapted to use in various situations and for various purposes where the speed ratio is required to be varied or adjusted, for example, as a part of the transmission of motor vehicles, or any analogous use where the load is variable and it is desired to alter the speed ratio or torque ratio to correspond.

The invention is herein shown applied to the motor vehicle type of transmission, especially to a motor vehicle driven by internal combustion engine through a fly wheel, the engine itself controlled by throttle. As is well known such engines do not generate power efficiently except at their higher speeds and while a given engine might be run, for example, as low as 150 R. P. M., or as high as ten times that rate or more, this would not be sufficient for the purposes of varying the speed or the torque to meet practical conditions. The main object of the present invention is to afford a successful mechanism to meet these requirements, and especially one which will be automatic, for a given throttle adjustment, so that as conditions of load may change the mechanism will itself afford different ratios of speed, accompanied by inverse ratios of torque, without the need of manual attention, or engaging or disengaging of mechanism, or shifting of gears, or the like.

A specific object is to utilize in a practical manner the action of centrifugal force as an element in the self-adjusting transmission of power, by means of a mass or masses carried around with the driver, that is to say, the engine shaft or fly wheel, and taking part in the transmission. The use of centrifugally operating masses has heretofore been suggested for example in Reece Patent 1,461,556, issued July 10, 1923. The mass is movably arranged on the driving parts so that it can be moved nearer to the axis thereof, opposed by its centrifugal force, which force therefore is constantly present as an actively pulling force and of substantial strength, indeed, this force increasing as the square of the driving speed, being extremely powerful with the higher speeds. In combination with such mass or masses are embodied gears or other connections extending to the driven shaft and of such nature that whenever there is a difference in rotary speed between the driving and driven parts, this constituting a relative rotation, the driven shaft turning slower than the driving, the mass is compelled to move inward toward the axis of rotation. The resulting action is, that as the driven shaft load resists rotation with a certain force or drag, thus tending to draw the centrifugal mass inwardly, the centrifugal force of the mass offers continual resistance to the inward pulling and therefore to the drag on the driven shaft, and in this manner the centrifugal force operates literally to pull the driven shaft forward, delivering torque, derived from the power of the driving shaft, fly wheel and engine. This existing constant centrifugal pull therefore constitutes a vital though invisible transmitting link or connection from the driving to the driven parts; it is non-positive and resilient in action, giving a forcible and almost intelligent self-adjusting transmission of torque. It effects a pull or rotation upon the driven shaft of as high a speed as the available power warrants, but no faster, considering the load to be overcome. It yields to excessive load but merely to the extent of adjusting the speed ratio so that the power is able to overcome the load, the action being in a sense ideal as it is wholly self-acting without requiring coupling, uncoupling or other manual attention. As each mass is preferably a permanent part of the mechanism its inward movement will be succeeded, after it has reached its extreme position, by a return or outward movement, a separate phase of action, the mass thereby returning to a point where it is available for further transmitting action. Whenever the load is not too great for the driven shaft to be driven at the full speed of the driving shaft there will be no substantial inward yield of the mass, and the centrifugal force under these circumstances, operates to hold the mass at an intermediate position, involving no internal movement of the mechanism, the forces being balanced, and the entire mechanism rotating substantially as a rigid unity. While the present invention and the prior patent possess these described qualities in common, the prior embodiment possesses certain disadvantages which it is an object of the present invention to overcome. For example, in the said patent each centrifugal mass was so connected that in its return or outward phase of movement the tendency of centrifugal force was to rotate the driven parts reversely, cancelling the previous driving effect, and requiring a special expedient, consisting of a device in the nature of a pawl and ratchet, to permit forward and prevent reverse rotation of the driven shaft, with a transmitting spring introduced to steady the intermittent impulses; which features, the pawl and ratchet and transmitting spring, are dispensed with in the present invention.

Other objects and advantages of the present invention will be made clear in the hereinafter following description of one form or embodiment thereof, or will be manifest to those skilled in the art. To the attainment of the objects and advantages mentioned, the present invention consists in the novel transmission of mechanical power, and the novel features of combination, arrangement, mechanism, design, detail, operation and method herein described or claimed.

A feature of the present invention is that the mass or mass portions are not fixed on their carriers or gears, but are free in the sense that while the carrier may force the mass inward against centrifugal force, the mass thereafter cannot in its return movement or outward phase apply its centrifugal force reversely to the carrier. The carrier discharges it and it reaches peripheral position without interaction with the carrier. For example loose weights, or flowing weights, such as portions of liquid may be the masses, these passing through a circuit, in the form of a weight train, the carrier forcing them inward and then discharging them to return outwardly.

In the accompanying drawings, Fig. 1 is substantially a central longitudinal vertical sectional view of one form or embodiment of a transmission apparatus embodying the principles of the present invention, the section line 1—1 being indicated on Fig. 4.

Fig. 3 is a similar right elevation and partial section taken on the broken line 3—3 of Fig. 1 further to the left than the line 2—2.

Fig. 4 is a right elevation taken partly in section on the line 4—4 of Fig. 1.

Figure 1:
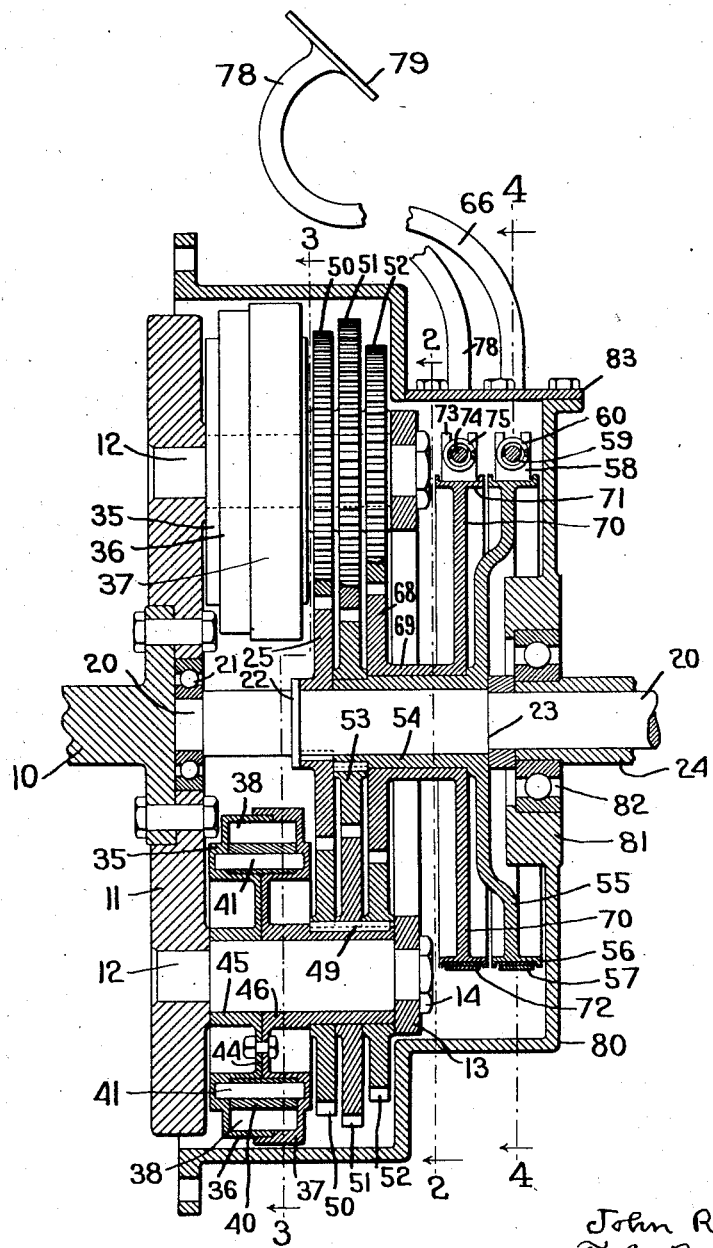
Figure 2:
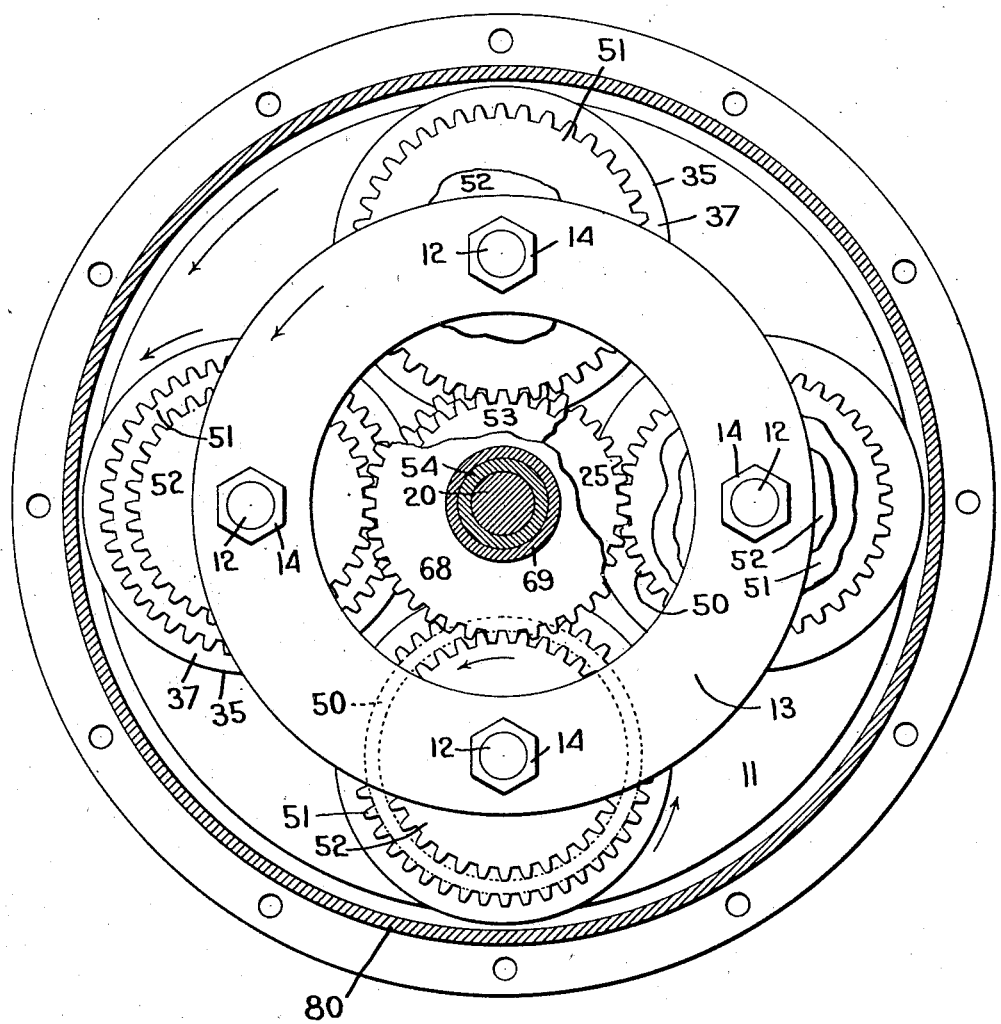
Fig. 2 is a right elevation of certain of the interior parts partly in section on the line 2—2 of Fig. 1.

A convenient method of description is first to enumerate the "driving" parts and later in sequence the driven parts, the planetating parts and the control mechanism and fittings. An internal combustion engine is represented by the driving shaft 10 and attached to this shaft is a wheel, disk or support 11, which with the mechanism that rotates with it may be considered as the fly wheel, giving the steadying effect of the fly wheel customarily used with such an engine.

Preferably the apparatus comprises more than one of the centrifugal mechanisms, and I have herein shown four of them, although obviously a different number could be used. Each centrifugal mechanism preferably comprises planetating elements as a means of giving inward movements to the successive weights or train of masses, and to accommodate the planetating parts a series of bearing studs 12 is attached to the fly wheel or disk 11. These studs project to the right and their extremities are interconnected by a flat ring 13, with nuts 14 rigidly connecting the ring to all of the studs. This substantially completes the description of the parts which rotate rigidly with the engine shaft and fly wheel.

The driven parts comprise primarily the driven shaft 20, and by the term shaft is to be understood a rotatable member of any nature. The driven shaft is preferably in axial alinement with the driver or fly wheel, although there are possible ways in which it could be located differently. At the left of the driven shaft 20 is a bearing 21 between the shaft and fly wheel. At an interior point the shaft has a collar 22 formed upon or attached to it, and further to the right is shown a shoulder 23, each of these forming a bearing for the parts to the right of them. The driven shaft 20 may be considered as having connections extending further to the right and eventually to the wheels of a vehicle, and a portion 24 of a universal joint is indicated, this being part of the flexible rearward connections. The driven shaft 20 also has a central gear 25 permanently keyed to it adjacent to the shoulder 22.

The general principles of the centrifugal connection intermediate the driving and driven members have been indicated. It may take different forms, that which is shown serving to illustrate the principles. It has been stated that the mass or masses or succession or stream of masses which give the vital action to the centrifugal mechanism is moved toward the axis of the system on a carrier or carriers, and while the carriers might take different forms, in fact any form that will serve to compel the masses to travel inward against centrifugal force, I believe the simplest form of carrier to be a planetating member, that is, a rotary disk or wheel mounted eccentrically on the driving member so as to be carried bodily around while subject to rotation on its axis. Each carrier or planetating disk being itself preferably a balanced member is free from the effect of centrifugal force, but owing to its reception of the mass or succession of masses, by means of its containers or pockets or other receiving means, it is enabled to take part in the hereinbefore described action whereby centrifugal force is made use of in the transmission of the rotary energy from the driving to the driven parts, the carrier discharging the successive masses near their extreme inward position, so that the centrifugal pressure will always be at one side only of the carrier, and therefore continuously unbalanced, resulting in continuous centrifugal stress and transmission. In the present embodiment the successive mass portions are discharged from the carrier, as stated, by which I mean they no longer cooperate with the carrier by asserting centrifugal force upon it. The centrifugal force now asserts itself to return the masses to outward position where they may be again picked up or engaged by the carrier and forced inwardly. Each weight or mass may be said to pass through a continuous circuit or cycle, acting upon the carrier in the first or inward phase, opposed by centrifugal force, and in the second or outward phase returning to a point where the mass may be engaged for a repetition of action; this cycle and circulation of masses, however, ceasing whenever the driven load is sufficiently light to permit equal speeds or unity ratio between the driving and driven parts.

The carrier 35 is preferably a planetating wheel formed with pockets or receptacles for the respective masses. The wheel 35 is shown as a hollow structure within which the centrifugal masses are contained. It may be built up of a left hand piece 36 and a right hand piece 37 fitting together and forming an annular space 38 between them. Within the annular space are a series of small plates or vanes 40 hinged or pivoted at 41 which, when in action, stand outwardly across the section of the annular space, as shown in Fig. 3, so as to form a series of receptacles or pockets 42. These pockets are adapted to engage, pick up, carry and force inwardly the successive mass portions, which in this case are indicated as portions of a suitable liquid 43, preferably mercury. It will be understood that the body of mercury stands as far outwardly as possible, forming a supply from which the pockets take up substantial portions, the supply being maintained by the discharged portions which return outwardly upon disengaging the carrier, as already described.

The details of the structure of each of the planetating carriers 35 may be various. Thus the left piece 36 and right piece 37 are shown as having inwardly extending webs 44, which are bolted together so as to form a unitary structure. The inward extremities of these webs are formed with outturned flanges 45 and 46 respectively, these together forming a sleeve fitting and rotating upon one of the studs 12, already described.

Now will be described the mode of connection between the carrier and the driven shaft by which the carrier is planetated due to speed differences between the driving and driven shafts. The sleeve or hub 45, 46 of the carrier constitutes a hollow shaft and this is shown extending to the right where it has keyed to it a number of planetating gears. The single gear 50 would be sufficient in many cases and this is shown directly in mesh with the central gear 25, already mentioned, keyed to the driven shaft. By this connection it will be seen that when the driven shaft is stationary or in slower rotation than the driving shaft the gear 50 and the carrier are caused to planetate. The centrifugal force of the flowing masses opposes this action, thereby transmitting torque to drive forwardly the driven shaft.

The carrier, hub or sleeve 46 has keyed to it not merely the gear 50, but a second and larger gear 51 and a third or smaller gear 52. The gear 51 takes part in an adjustment for securing a geared reduction of speed when desired, and the gear 52 takes part in connections for effecting a reverse direction of driven shaft rotation, frequently desirable in driving vehicles.

Referring first to the connections for effecting slow forward drive, these include the planetating gear 50 engaging the driven shaft central gear 25, and also the larger planetating gear 51, which is shown engaging a smaller central gear 53 keyed to a sleeve 54 loosely surrounding the driven shaft. This sleeve extends to the right where it is formed with a web 55 carrying a band, pulley or rim 56 engaged by a brake or friction band 57. Normally the elements 53 to 56 will rotate idly, but may be brought to rest by applying the band 57 frictionally to the pulley. This may be done as follows: The extremities of the band 57 are shown as formed with lugs 58, see Figs. 1 and 4. These lugs may be forced toward each other to tighten the band by means of a screw rod 59 passing through the lugs. A spring 60 forces the lugs normally apart, loosening the band. A nut 61 at the extremity of the rod adjusts its action. A fixed sleeve or bearing 62 surrounds the rod 59, the sleeve having a flange 63 by which it is positioned. The far extremity of the sleeve is curved or concave forming a cam at 64 which is engaged by a corresponding convex portion or cam 65 mounted on the rod, so that upon turning the rod it is caused to retract and thus tighten the brake band. The rod extremity is formed with an outstanding lever 66 having a slow pedal 67 at its end.

Thus by depressing the slow pedal 67 the brake band is tightened and the sleeve 54 and central gear 53 are rendered stationary. The result is a slow forward drive of the driven shaft, with high torque, useful for occasional emergencies. This is because not merely the planet gear 50, but also the planet gear 51 come into action. These two gears travel planetatingly around the two central gears, 53, which is fixed, and attached to the driven shaft. The result is that the gear 25 and driving shaft are rotated forwardly, not at the full speed, but at a differential speed, a fraction of the full speed, depending on the differences in diameters of the gears. The driven shaft central gear being larger than the fixed gear 53, the driven shaft will be rotated in the same direction as the driven shaft, or forwardly. Upon releasing the pedal 67 the normal conditions are restored and the driven shaft will be rotated at the full speed which is possible with the load to be overcome.

Reverse drive may be effected by bringing into action the planet gear 52. This is smaller than gear 50 and engages a central gear 68 larger than gear 25. Obviously by anchoring the central gear 68 the driven shaft will be turned at a fractional speed and in a reverse direction. For this purpose the gear 68 is shown as formed with a sleeve 69 loosely surrounding the sleeve 54. The sleeve 69 is formed with a web 70 having a pulley or rim 71 engaged by a brake band 72. This construction may be similar to the one already described. The band is shown as having lugs 73 through which passes a screw rod 74, the lugs held apart by a spring 75. By a construction similar to that described a pedal lever 78 carrying a reverse pedal 79 may be operated to tighten the band 72, thus anchoring the central gear 68 and bringing about reverse drive.

The described working parts are shown surrounded by a stationary housing 80, suitably shaped for compactness. Near the driven shaft this housing is formed with a hub 81 between which and the driven shaft is a bearing 82. At the top of the housing is a removable cover 83 above the brake band mechanism. The housing is formed with a flange 84 at one side, as shown in Fig. 4, to receive the cover 83 and at the other side an enlargement 85, which also constitutes the bearing or support for the sleeve 62, previously mentioned, and also a sleeve not shown for the screw rod 74.

When adjusted for forward driving, the action of the mechanism may be explained as follows: If the driven shaft and the central gear carried by it are held against rotation, the planetating gear and the carrier attached to it will rotate upon their axes while bodily carried around with the driving parts. If the carrier were not engaged by masses or otherwise retarded, there would be free planetation without operative effect. Assuming now that the planetation of the carrier be retarded, namely, by the resistance of the centrifugal force acting upon the successive masses which are forced inwardly by the carrier, the tendency will be to drive forwardly the driven shaft. The centrifugal force referred to is that about the main axis of the apparatus and it will be very considerable when the fly wheel is rotating at high speed. For a given mass the centrifugal force increases as the square of the rotary speed. If there is a substantial load or resistance opposing the driven shaft, the latter will be started in rotation by the described centrifugal action as soon as it becomes sufficient, as the driving parts are speeded up, to resist the planetating rotation of the carrier. With ordinary loads, the present invention is able to deliver unitary speed ratio, that is, when the centrifugal force of the masses engaged with the carrier is sufficient to prevent planetating rotation, and thus sufficient to compel the centrifugal gear and the driven shaft to turn at full speed, these parts all going with the fly wheel substantially as though locked together, thus giving an exceedingly quiet and effective transmission at unit ratio, free from interior play of the mechanism.

When the driven shaft load is increased to a point too great to be thus driven at full speed under any given conditions, the speed ratio reduces and, temporarily, the fly wheel speed may become reduced to a point where the centrifugal force of the masses is insufficient to maintain unitary ratio. The relatively slower rotation of the driven shaft, or rather the difference in rotary speeds, is the factor which causes the carrier to planetate. The mass-train is then forced inwardly in a progressive manner by the carrier and discharged at the most inward point. The centrifugal force actively opposes this inward forcing action and, as already explained, this live force or pull is thus effectively applied to the forward effort on the driven shaft at the reduced speed.

and the reduced work permits the driving shaft to speed up, which it will do to a substantial extent, thus maintaining the driving torque or effort. Further, the reduction of speed ratio by the described change of internal conditions, involving the planetating motions, will be accompanied by a proportionate increase of torque delivered to the driven shaft. The action adjusts itself so that for any given load or resistance on the driven shaft, the mechanism will operate to deliver the greatest possible speed to the driven shaft consistent with the delivery thereto of the necessary torque. A self-maintained balance is thus brought about wholly by the action of the device and without conscious attention of the operator, affording always the necessary torque for any given conditions and the greatest possible speed available with such torque; for example, when an automobile passes to a point of more difficult road conditions, it will automatically slow down to the most advantageous speed and at this speed will effectively overcome the conditions presented.

It is to be understood, of course, that the operator may always supplement this automatic readjustment by means of the throttle, opening or closing it to give increase or decrease of torque or speed.

When moved inwardly by the carrier the successive masses or portions are discharged at or near their most inward point of movement. This means that there is no operative relation between the carrier and the mercury when the mercury passes the most inward point. Indeed at this time centrifugal force operates on the mercury to force it outwardly to the most outward or starting point. I have heretofore suggested utilizing this outward movement to redeliver energy to the driving parts, but the present construction is a simplification, dispensing with any second or return carrier, and involving the free discharge and return outwardly of the mercury portion. The mercury, it will be noted, is maintained in a sort of pool in the outer part of the hollow carrier or in the annular space or casing thereof, the pockets picking up mercury as they start inwardly and the supply being maintained by the mercury restored upon discharge all as roughly indicated in Fig. 3.

It may be explained further that the masses of mercury which are in engagement with the carrier may be considered as acting cooperatively, and to establish, under any given conditions, a center of mass which in some cases may stand upon a radius substantially at right angles to a line connecting the general axis and the planetating axis. The unbalanced masses in the pockets may be considered as affording a centrifugal force, which may be maintained steadily during steady conditions of load and speed. This condition of unbalance is self-sustaining because as fast as masses are discharged at the inner side others are taken up at the outer side. Constant minor variations in the mass and the center of mass are apt to occur, especially whenever variations in speed and load are taking place. When the load is light no actual rotation of the carrier is necessary as the centrifugal force on the unbalanced masses in the carrier may be sufficient to transmit the necessary torque and to overcome the load. The proportions and speeds which have been mentioned are merely examples and may be indefinitely altered. If the load be gradually decreased the driven shaft speed will gradually increase and as it approaches the driving shaft speed the carrier rotation will grow slower and slower until eventually it ceases planetating as the speed ratio becomes unity.

As stated, when engine speed increases, the centrifugal force increases greatly. By speeding up the engine from 800 to 1100 R. P. M. the centrifugal force and therefore the ability to transmit torque will be practically doubled. This factor gives great elasticity of action, and high transmitting power and torque may be secured by manipulation of the throttle. At the same time by closing down the engine to low speed there is no likelihood of accidental stalling because centrifugal force is negligible and the shafts are practically disconnected.

It will be seen that the driving connections of this invention are of a yielding rather than a positive character. The utilization of centrifugal force in this action gives a perfectly resilient connection between the two shafts and as arranged this is both effective and free from irregular action. At low engine speeds the centrifugal force is negligible and there will be no transmission so that by merely slowing down the engine is afforded the effect of the throwing out of the usual clutch, thus dispensing with a clutch. As the speed increases the centrifugal force comes more and more into operative effect and actual drive takes place as soon as the transmitted torque exceeds the resistance of the driven shaft. For similar reasons a vehicle can be allowed to run down hill at will, either forwardly or backwardly, by sufficiently slowing the engine and without any actual disengagement; resumption of drive being available at any moment by opening the throttle and speeding the engine. The present invention avoids the substantial inconvenience of frequent speed readjustments. Constructors of cars have been hampered by this fact and compelled to introduce a relatively large ratio of speed reduction at the rear axle so as to minimize the speed changes on the road. For purposes of efficiency a lesser reduction would be desirable and is permitted by the present invention, thus economizing fuel and increasing convenience and salability.

The action of introducing a geared speed reduction and of changing the driven shaft to a reverse rotation at reduced speed have been sufficiently described.

It will thus be seen that we have described a power transmission method and apparatus embodying the principles and attaining the objects and advantages of the present invention. Since many matters of construction, arrangement, combination, design and detail may be variously modified without departing from the principles involved, it is not intended to limit the scope of the present invention except in so far as set forth in the appended claims.

What is claimed is:

1. Power transmission apparatus comprising in combination the driving and driven members, a revoluble support turned by the driving member, walls constituting an endless channel carried on said support and providing a closed circuit for a succession of mass portions, such mass portions, and means working in said channel, and having connections from the driven member for actuating it, for thrusting successive mass portions inwardly guided by one portion of the channel while permitting their free outward return guided by another portion of the channel.

2. Power transmission apparatus as in claim 1 and wherein the channel walls are substantially circular concentric walls affording an annular channel, and the mass thrusting means consists of a train of traveling vanes planetated continuously around the channel adapted to engage and thrust the masses when moving inwardly at one side, but permitting disengagement when the masses move outwardly under centrifugal force at the other side of the channel.

3. Power transmission apparatus comprising in combination the driving and driven members, a revoluble support turned by the driving member, a planetating carrier mounted on the support and having connections from the driven member for actuating it, and a succession of centrifugal mass portions cooperating with the carrier, the carrier having annular walls affording an annular channel in which the mass portions are confined, and flap elements therein arranged to thrust the mass portions successively inward but permit the free return thereof by centrifugal force.

4. Power transmission apparatus comprising in combination the driving and driven members, a revoluble support turned by the driving member, a planetating carrier mounted on the support and having connections from the driven member for actuating it, a series of swinging vanes on said carrier, and a body of flowing mass, portions of which are carried inwardly by said vanes and released to return freely outwardly.

5. Power transmission apparatus as in claim 4 and wherein the carrier is formed with an annular channel, and the vanes being pivoted therein to open out for carrying the mass portions and to close thereafter for releasing the same.

6. Power transmission apparatus comprising in combination the driving and driven members, a revoluble support turned by the driving member, a planetating carrier mounted on the support, centrifugal means for retarding the carrier, a gear train including a planet gear on the support and a central gear on the driven member for actuating the carrier, together with a second gear train including a planet gear on the support and a second central gear, the two gear trains presenting different ratios, and means for rendering stationary at will the second central gear, whereby to gear down the driven member to slow speed.

7. Power transmission apparatus as in claim 6 and wherein the proportions of the gears are such as to give reverse drive at slow speed to the driven member.

In testimony whereof, we have affixed our signatures hereto.

JOHN REECE.
FRANKLIN A. REECE.